United States Patent
Oprescu-Surcobe et al.

(10) Patent No.: US 7,356,000 B2
(45) Date of Patent: Apr. 8, 2008

(54) METHOD AND APPARATUS FOR REDUCING CALL SETUP DELAY

(75) Inventors: Valentin Oprescu-Surcobe, Northbrook, IL (US); John M. Harris, Chicago, IL (US); Sean S. Kelley, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 776 days.

(21) Appl. No.: 10/718,947

(22) Filed: Nov. 21, 2003

(65) Prior Publication Data

US 2005/0113100 A1 May 26, 2005

(51) Int. Cl.
*H04J 1/16* (2006.01)
*H04Q 7/00* (2006.01)

(52) U.S. Cl. .................. 370/329; 370/252; 370/337; 370/347; 455/437; 455/450

(58) Field of Classification Search ............... 370/252, 370/253, 280, 329, 332, 337, 347–349, 537, 370/543, 320, 335, 342, 441, 468, 479; 450/69, 450/434, 437, 450, 522; 455/437, 450
See application file for complete search history.

(56) References Cited

U.S. PATENT DOCUMENTS

| | | | |
|---|---|---|---|
| 5,299,198 A * | 3/1994 | Kay et al. ............... | 370/347 |
| 5,513,183 A | 4/1996 | Kay et al. | |
| 6,757,541 B2 * | 6/2004 | Achour et al. .......... | 455/450 |
| 6,804,219 B2 * | 10/2004 | Koo et al. .............. | 370/335 |
| 2002/0154610 A1 * | 10/2002 | Tiedemann et al. ..... | 370/329 |

OTHER PUBLICATIONS

Harris, John M. et al.: "Capacity Aware, Speculative F-SCH Channel Assignment", Performance Analysis Department Network Advanced Technology, May 9, 2002, https://priorart.ip.com/viewPub.js:?stype=dtFreeTextSearch&scache=24681110&snum=0&snum=0&kwHighlight=true&squery=kwhl%2.

"GPRS Speculative Downlink TBF Establishment", Jun. 2001.

* cited by examiner

*Primary Examiner*—Afsar Qureshi
(74) *Attorney, Agent, or Firm*—Jeffrey K. Jacobs (57) ABSTRACT

Various embodiments are described herein to address the need for reducing call setup delays with respect to supplemental channels. Modifications to channel assignment messaging (104), such as an enhanced ECAM, and service connection messaging (108), such as an enhanced SCM, are described. These modifications enable the assignment of SCHs (110) earlier in the call setup sequence. In addition, embodiments for determining and anticipating when such modified messaging may effectively speed the transfer of data (including VoIP) between a BS (201) and an MS (210) are described.

18 Claims, 5 Drawing Sheets

| FIELD | LENGTH (bits) |
|---|---|
| REV_SCH_ASSIGN_INCL | 1 |
| START_TIME_UNIT | 0 OR 3 |
| REV_SCH_DTX_DURATION | 0 OR 4 |
| USE_T_ADD_ABORT | 0 OR 1 |
| NUM_REV_SCH | 0 OR 2 |
| NUM_REV_SCH OCCURRENCES OF THE FOLLOWING RECORD: | |
| { (NUM_REV_SCH) | |
| REV_SCH_ID | 1 |
| REV_SCH_DURATION | 4 |
| REV_SCH_START_TIME | 5 |
| REV_WALSH_ID | 1 |
| REV_SCH_NUM_BITS_IDX | 4 |
| } (NUM_REV_SCH) | |

METHOD AND APPARATUS FOR REDUCING CALL SETUP DELAY

FIELD OF THE INVENTION

The present invention relates generally to mobile communications and, in particular, to reducing call setup delays in mobile communication systems.

BACKGROUND OF THE INVENTION

Figure 1A:
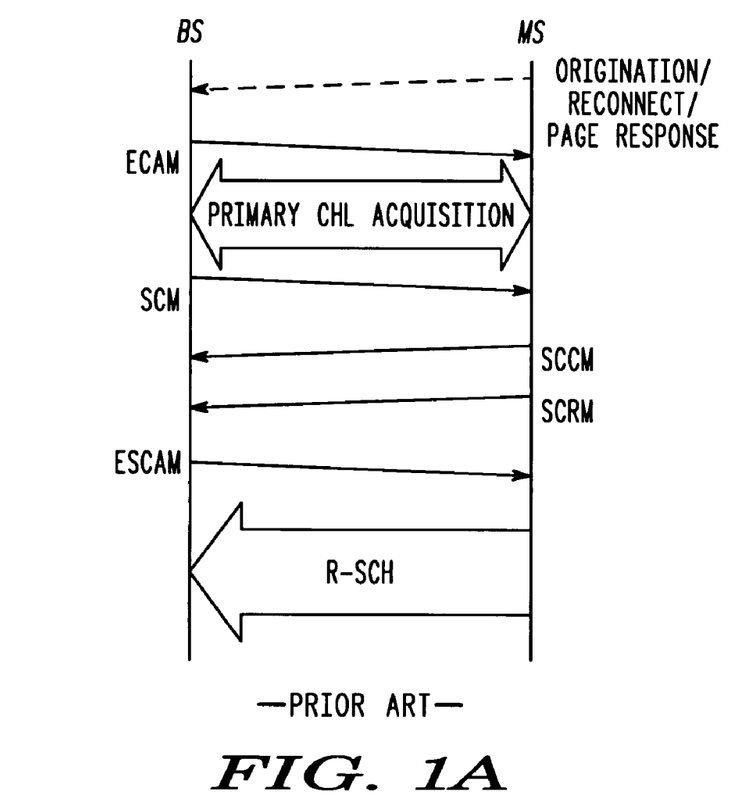
FIG. 1A is a messaging flow diagram depicting prior art messaging related to supplemental channel assignment.

In mobile communication systems today, such as cdma2000 systems, when a mobile call is being set up or resumed (i.e., reactivated from dormancy) the assignment of higher data rate supplemental channels occurs relatively late in the mobile call setup sequence. FIG. 1A illustrates this problem. FIG. 1A is a messaging flow diagram depicting prior art messaging related to supplemental channel assignment. A mobile station (MS) may send channel-assignment-related messaging such as an Origination, a Reconnect, or a Page Response to a base station (BS). Whether in response to or independent of such messaging, the BS sends a channel assignment message, such as an Extended Channel Assignment Message (ECAM), followed by channel acquisition messaging for the assigned primary channel. After channel acquisition, the BS sends a Service Connect Message (SCM) to the MS, and the MS responds with a Service Connect Completion Message (SCCM). Finally, the MS can request a supplemental channel from the BS using a Supplemental Channel Request Message (SCRM). The BS then assigns a reverse supplemental channel (R-SCH) to the MS using an Extended Supplemental Channel Assignment Message (ES-CAM). Thus, only after the cumulative delays introduced by the above messaging can an R-SCH be used by an MS to send its data or voice over internet protocol (VoIP) packets, for example.

Needless to say, reduced call setup delays are desirable. Faster and more responsive data communication and/or VoIP service improves the end-user experience and provides network operators with a competitive advantage when attracting new customers and maintaining their existing customer base. Therefore, a need exists for an apparatus and method for reducing call setup delays with respect to supplemental channels.

DETAILED DESCRIPTION OF EMBODIMENTS

Various embodiments are described herein to address the need for reducing call setup delays with respect to supplemental channels. Modifications to channel assignment messaging, such as an enhanced ECAM, and service connection messaging, such as an enhanced SCM, are described. These modifications enable the assignment of SCHs earlier in the call setup sequence. In addition, embodiments for determining and anticipating when such modified messaging may effectively speed the transfer of data (including VoIP) between a BS and an MS are described.

Figure 1B:
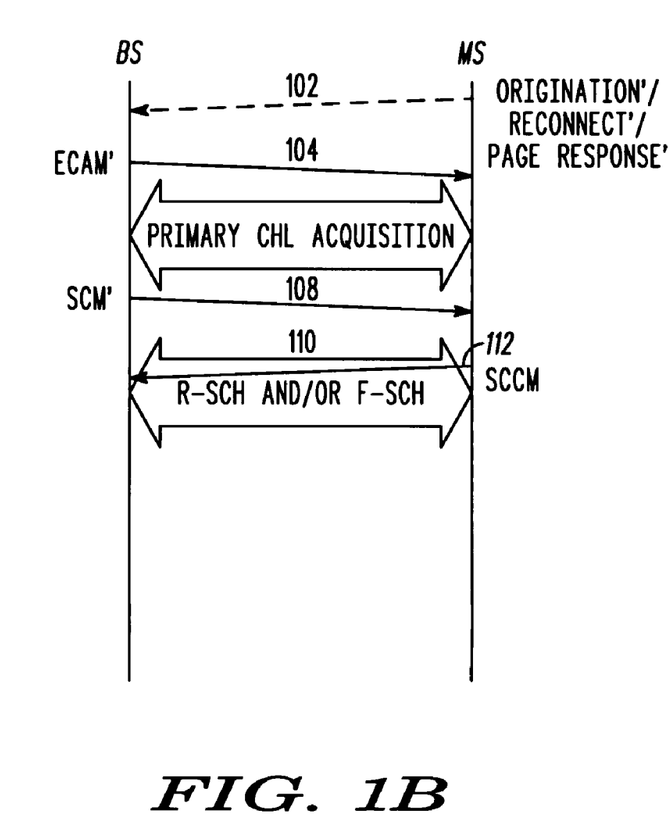
FIG. 1B is a messaging flow diagram depicting messaging related to supplemental channel assignment in accordance with multiple embodiments of the present invention.
Figure 2:
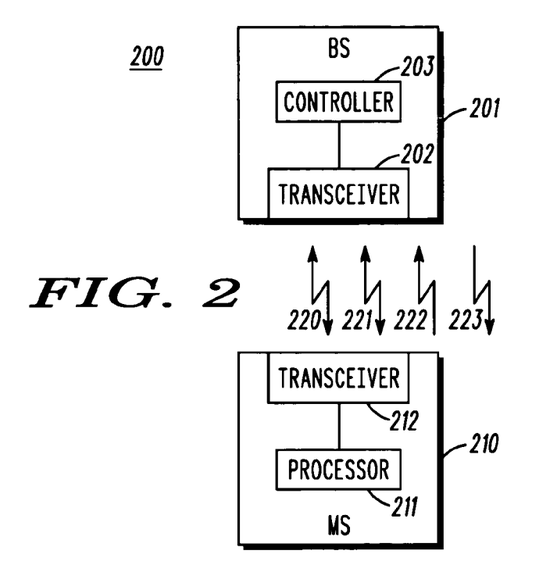
FIG. 2 is a block diagram depiction of a mobile communication system in accordance with multiple embodiments of the present invention.

The disclosed embodiments can be more fully understood with reference to FIGS. 1–7. FIG. 2 is a block diagram depiction of a mobile communication system 200 in accordance with multiple embodiments of the present invention. Communication system 200 is a well-known Code Division Multiple Access (CDMA) system, specifically a cdma2000 system, which is based on the Telecommunications Industry Association/Electronic Industries Association (TIA/EIA) standards IS-2000 and IS-2001, suitably modified to implement the present invention. Alternative embodiments of the present invention may be implemented in communication systems that employ other technologies similar to IS-2000 and IS-2001.

Those skilled in the art will recognize that FIG. 2 does not depict all of the network equipment necessary for system 200 to operate but only those system components and logical entities particularly relevant to the description of embodiments of the present invention. In particular, the network equipment of system 200 comprises components such as base station (BS) 201. BSs are well-known to comprise components such as base station controllers (BSCs) and base transceiver systems (BTSs), neither of which are specifically shown.

BS 201 is depicted in FIG. 2 as comprising controller 203 and transceiver 202. In general, components such as BS controllers and BS transceivers are well-known. For example, BS controllers are known to comprise basic components such as microprocessors, memory devices, and/or logic circuitry. Such BS components are typically adapted to implement algorithms that have otherwise been expressed logically, for example, in high-level design languages or descriptions, as computer instructions, and/or in logical flow diagrams. Thus, given an algorithm, a logic flow, a messaging flow, and/or a protocol specification, those skilled in the art are aware of the many design and development techniques available to implement a BS that performs the given logic.

Thus, BS 201 represents a known BS that has been adapted, in accordance with the description herein, to implement multiple embodiments of the present invention. Specifically, BS 201 may alternatively embody the logic flows described with respect to FIGS. 4 and 5. Furthermore, controller 203 and transceiver 202 are not intended to precisely correspond to a BSC and a BTS, respectively. Rather, controller 203 and transceiver 202 each represent devices that can extend across separate physical components that perhaps are not even co-located. For example, alternative embodiments of controller 203 include BTS-only embodiments and BSC-BTS-combined embodiments.

BS 201 uses an air interface comprising channels 220–223 for communication with mobile station (MS) 210.

MS platforms are well-known to include devices such as mobile phones, computers, personal digital assistants, gaming devices, etc. MS 210, in particular, comprises processor 211, transceiver 212, a keypad (not shown), a speaker (not shown), a microphone (not shown), and a display (not shown). Processors, transceivers, keypads, speakers, microphones, and displays as used in MSs are all well known in the art. For example, processors are known to comprise basic components such as microprocessors, memory devices, and/or logic circuitry. Such MS components are typically adapted to implement algorithms that have otherwise been expressed logically, for example, in high-level design languages or descriptions, as computer instructions, and/or in logical flow diagrams. Thus, given an algorithm, a logic flow, a messaging flow, and/or a protocol specification, those skilled in the art are aware of the many design and development techniques available to implement an MS that performs the given logic. Thus, MS 210 represents a known MS that has been adapted, in accordance with the description herein, to implement embodiments of the present invention. Specifically, MS 210 may alternatively embody the logic flows described with respect to FIGS. 6 and 7.

Operation of embodiments in accordance with the present invention occurs substantially as follows. FIG. 1B is a messaging flow diagram depicting messaging related to supplemental channel assignment in accordance with multiple embodiments of the present invention. Processor 211 of MS 210 sends messaging 102 to BS 201 via transceiver 212 and reverse common signaling channels/forward common signaling channels (r-cschs/f-cschs) 220. As labeled in FIG. 1B, messaging 102 may correspond to an Origination', a Reconnect', or a Page Response'. Multiple messages are listed, since any of them may be sent by MS 210 prior to channel assignment by BS 201. However, messaging 102 is not necessary for channel assignment, since channel assignment may occur while MS 210 is still in an idle state.

In one embodiment an Origination', a Reconnect', and/or a Page Response' may refer to standard IS-2000 messaging as discussed with respect to FIG. 1A. However, in an alternate embodiment the Origination', the Reconnect', and the Page Response' represent modified IS-2000 messaging. This modification may comprise, for example, the addition of a single bit in each message that indicates that MS 210 is requesting a supplemental channel. Instead, the modification to each message may comprise the addition of messaging such as that in or similar to an IS-2000 Supplemental Channel Request Message (SCRM).

In a first embodiment of the present invention, prior to channel assignment, controller 203 of BS 201 determines whether upon channel assignment MS 210 may require a higher data rate than that which a primary channel can provide. MS 210 is in a non-traffic state (e.g., an idle or access state) and when BS 201 determines that MS 210 may require the higher data rate upon channel assignment, controller 203 sends channel assignment messaging 104 via transceiver 212 and r-cschs/f-cschs 220 to MS 210 in order to transition MS 210 to a traffic state. In the first embodiment, channel assignment messaging 104 comprises both primary channel assignment information and IS-2000 Supplemental Channel assignment information. Present IS-2000 ECAMs, such as that referred to in FIG. 1A, contain primary channel assignment information but not supplemental channel assignment information. Primary channels include fundamental channels, dedicated control channels, and channels that are at least partially control-bearing, for example. Thus, the ECAM' of FIG. 1B represents a modified IS-2000 ECAM.

Figure 3:
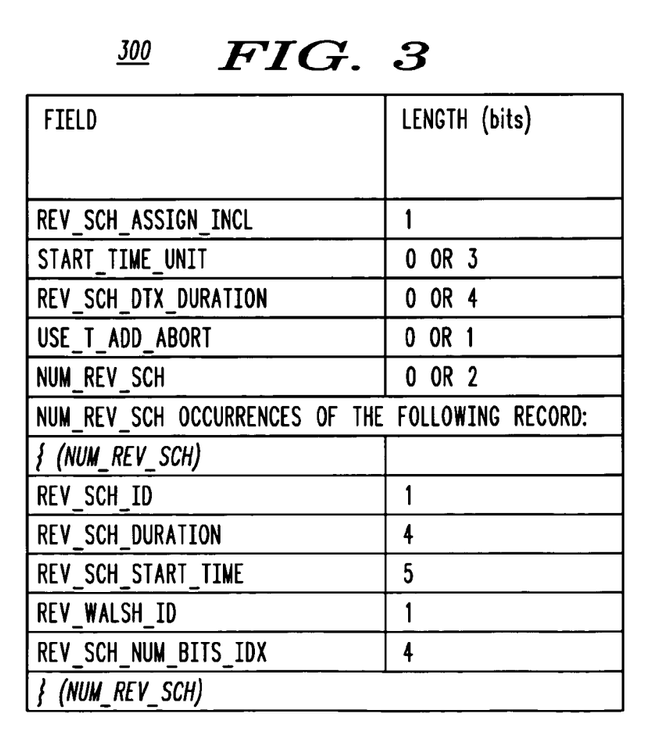
FIG. 3 is a table depicting exemplary bit definitions for fields to be added to existing messaging in accordance with multiple embodiments of the present invention.

A person of skill in the art will, of course, realize that there are many ways to convey supplemental channel assignment information and primary channel assignment information in channel assignment messaging generally. For example, an IS-2000 ECAM may be modified (as in the first embodiment) or other channel assignment messages may be modified or even newly created, in addition to or instead of either an IS-2000 ECAM or a modified IS-2000 ECAM. FIG. 3 is a table 300 depicting exemplary bit definitions for fields that may be added to existing messaging in accordance with multiple embodiments of the present invention. A detailed description of table 300 fields, as added to an IS-2000 ECAM, is provided below as an example of modified messaging that supports R-SCH assignment (but not a F-SCH assignment):

Section and table references are to C.P0005-C/TIA-2000.5-C (3GPP2 reference/TIA reference).

REV_SCH_ASSIGN_INCL

Reverse Supplemental Channel assignment included indicator.

The base station shall set this field to '1' if this message includes a Reverse Supplemental Channel assignment; otherwise, the base station shall set this field to '0'.

START_TIME_UNIT

Unit for start time.

If REV_SCH_ASSIGN_INCL is set to '0', the base station shall omit this field; otherwise, the base station shall include this field and set it as follows:

The base station shall set this field to indicate the units of start time included in this message, Extended Supplemental Channel Assignment Message, Forward Supplemental Channel Assignment Mini Message, Reverse Supplemental Channel Assignment Mini Message, and Universal Handoff Direction Message. The base station shall set this field to one less than the number of 20 ms frames that determines the START_TIME_UNIT.

REV_SCH_DTX_DURATION

Discontinuous Transmission on Reverse Supplemental Channel.

If REV_SCH_ASSIGN_INCL is set to '0', the base station shall omit this field; otherwise, the base station shall include this field and set it as follows:

The base station shall set this field to the maximum duration of time in units of 20 ms that the mobile station is allowed to stop transmission on a Reverse Supplemental Channel within the reverse assignment duration. The base station shall set this field to '0000' if the mobile station is to stop using a Reverse Supplemental Channel once it has stopped transmitting on that Reverse Supplemental Channel. The base shall set this field to '1111' if the mobile station is allowed to resume transmission on a Reverse Supplemental Channel at any time within the reverse assignment duration.

USE_T_ADD_ABORT

Reverse Supplemental Channel use T_ADD abort indicator.

If REV_SCH_ASSIGN_INCL is set to '0', the base station shall omit this field; otherwise, the base station shall include this field and set it as follows:

The base station shall set this field to '1' to indicate that the mobile station is to utilize the T_ADD Reverse Supplemental Channel abort feature for this reverse assignment; otherwise, the base station shall set this field to '0'.

NUM_REV_SCH
  Number of Reverse Supplemental Channels assigned.
    If REV_SCH_ASSIGN_INCL is set to '0', the base station shall omit this field; otherwise, the base station shall include this field and set it as follows:
      The base station shall set this field to the number of Reverse Supplemental Channels assigned. The base station shall not set this field to '00'.
The base station shall include NUM_REV_SCH occurrences of the following record:
REV_SCH_ID
  Reverse Supplemental Channel identifier.
    The base station shall set this field to the identifier of the Reverse Supplemental Channel.
REV_SCH_DURATION
  Duration of Reverse Supplemental Channel assignment.
    The base station shall set this field to '1111' to indicate that the mobile station may transmit on the Reverse Supplemental Channel specified by REV_SCH_ID, starting at the explicit start time specified by REV_SCH_START_TIME in this message, until the start time specified by a subsequent Reverse Supplemental Channel assignment corresponding to the same Supplemental Channel (see Section 2.6.6.2.5.1.1). The base station shall set this field to the duration according to Table 3.7.3.3.2.37-3, starting at the explicit start time specified by REV_SCH_START_TIME in this message, during which the mobile station may transmit on the Reverse Supplemental Channel specified by REV_SCH_ID.
    The base station shall not set this field to '0000'.
REV_SCH_START_TIME
  Start time for Reverse Supplemental Channel assignment.
    The base station shall set this field to the System Time, in units of time specified by START_TIME_UNIT, (modulo 32) at which the mobile station may start transmitting on the Reverse Supplemental Channel specified in this message. The explicit start time for transmitting on the Reverse Supplemental Channel is the time for which $(t/(START\_TIME\_UNIT_S+1)-REV\_SCH\_START\_TIME) \bmod 32 = 0$, where t is the System Time in units of 20 ms.
    In one embodiment of the present invention the start time indicated may be determined based on an expected traffic channel tuning completion time (i.e., when the start time is being indicated in channel assignment messaging rather than in post-channel-assignment messaging) and on a relative quantity of available wireless resources. In this embodiment, then, an earlier start time may be determined when the relative quantity of available wireless resources is greater (in other words, when there is less concern over wasting wireless resources), and accordingly, a later start time may be determined when the relative quantity of available wireless resources is less (i.e., when wasting wireless resources is to be avoided). Adjusting the start time in this manner may allow the MS to begin using the R-SCH without waiting after the MS acquires the channel.
REV_WALSH_ID
  Reverse Supplemental Channel Walsh cover identifier.
    The base station shall set this field according to Table 3.7.3.3.2.37-1 to indicate the Walsh cover ID that the mobile station is to use when transmitting number of bits per frame specified by REV_SCH_NUM_BITS_IDX on the Reverse Supplemental Channel specified by REV_SCH_ID. If only one reverse supplemental channel is assigned, the base station should set this field to the default value for the REV_WALSH_ID as specified in Section 2.6.4.2.
REV_SCH_NUM_BITS_IDX
  Reverse Supplemental Channel number of bits per frame index.
    If USE_FLEX_NUM_BITS is equal to '0' or if USE_FLEX_NUM_BITS is equal to '1' and RSCH_NBIT_TABLE_ID[REV_SCH_ID] is equal to '0000', then the base station shall set this field according to Table 3.7.3.3.2.37-2 to indicate the Reverse Supplemental Channel number of information bits per frame and the number of CRC bits per frame, corresponding to REV_WALSH_ID field.
    If USE_FLEX_NUM_BITS is equal to '1' and RSCH_NBIT_TABLE_ID[REV_SCH_ID] is not equal to '0000', then the base station shall set this field to indicate the Reverse Supplemental Channel number of information bits per frame, corresponding to REV_WALSH_ID field to be NUM_BITS[RSCH_NBIT_TABLE_ID[REV_SCH_ID]][REV_SCH_NUM_BITS_IDX] and the Reverse Supplemental Channel number of CRC bits per frame, corresponding to REV_WALSH_ID field to be CRC_LEN_IDX[RSCH_NBIT_TABLE_ID[REV_SCH_ID]] [REV_SCH_NUM_BITS_IDX].

After receiving channel assignment messaging 104 via transceiver 212, MS 210 and BS 201 exchange known signaling 106 via transceivers 202 and 212 to effect the acquisition of the primary channel 221 by MS 210, using the primary channel assignment information received. Although FIG. 1B shows service connect messaging 108 and service connect completion messaging 112, in the first embodiment these messages are not needed for MS 210 to begin using, via transceiver 212, a supplemental channel corresponding to the IS-2000 Supplemental Channel assignment information received. That is, MS 210 may begin sending and/or receiving data 110 (VoIP included) via a reverse supplemental channel (R-SCH) 222 and/or a forward supplemental channel (F-SCH) 223, as assigned in the channel assignment messaging 104.

In a second embodiment of the present invention, controller 203 of BS 201 sends channel assignment messaging 104 via transceiver 202 and r-cschs/f-cschs 220 to MS 210 to transition MS 210 to a traffic state. However, in contrast to the first embodiment, in the second embodiment, channel assignment messaging 104 comprises IS-2000 channel assignment messaging, such as an ECAM containing primary channel assignment information but not supplemental channel assignment information. After receiving channel assignment messaging 104 via transceiver 212, MS 210 and BS 201 exchange known signaling 106 via transceivers 202 and 212 to effect the acquisition of the primary channel 221 by MS 210, using the primary channel assignment information received.

In the second embodiment, prior to service connection, controller 203 determines whether upon service connection MS 210 may require a higher data rate than that which a primary channel can provide. When BS 201 determines that MS 210 may require the higher data rate upon service connection, controller 203 sends service connection messaging 108 via transceiver 202 and primary channel 221 to MS 210, and while in a traffic state, processor 211 receives via transceiver 212 service connection messaging 108. In the second embodiment, service connection messaging 108 comprises IS-2000 Supplemental Channel assignment information. Present IS-2000 SCMs, such as that referred to in FIG. 1A, do not contain supplemental channel assignment information. Thus, the SCM' of FIG. 1B represents a modified IS-2000 SCM.

A person of skill in the art will, of course, realize that there are many ways to convey supplemental channel assignment information in service connection messaging generally. For example, an IS-2000 SCM may be modified (as in the second embodiment) or other service connection messages may be modified or even newly created, in addition to or instead of either an IS-2000 SCM or a modified IS-2000 SCM. Table 300 depicts exemplary bit definitions for fields to be added to existing messaging, such as either an IS-2000 ECAM (discussed above) or an IS-2000 SCM. Thus, the detailed exemplary description of table 300 fields discussed above may also be added to an IS-2000 SCM to create an SCM'.

In the second embodiment then, MS 210 receives service connection messaging 108 and, in response, sends service connection completion messaging 112. MS 210 may now begin using, via transceiver 212, a supplemental channel corresponding to the IS-2000 Supplemental Channel assignment information received. That is, MS 210 may begin sending or receiving data 110 (VoIP included) via a reverse supplemental channel (R-SCH) 222 and/or a forward supplemental channel (F-SCH) 223, as assigned in the service connection messaging 108.

Thus, in both the first and second embodiments, a supplemental channel may be used for data transfer between BS 201 and MS 210 without needing to wait for all of the messaging shown in FIG. 1A. Specifically, supplemental data transfer may begin without sending/receiving an SCRM and an ESCAM. Additionally, in the case of the first embodiment, an SCM and an SCCM need not be sent/received either. Therefore, benefits such as reduced call setup delays (e.g., data being transferred with less delay), reduced wireless bandwidth requirements, and increased mobile battery life may be realized by the embodiments described above.

Figure 4:
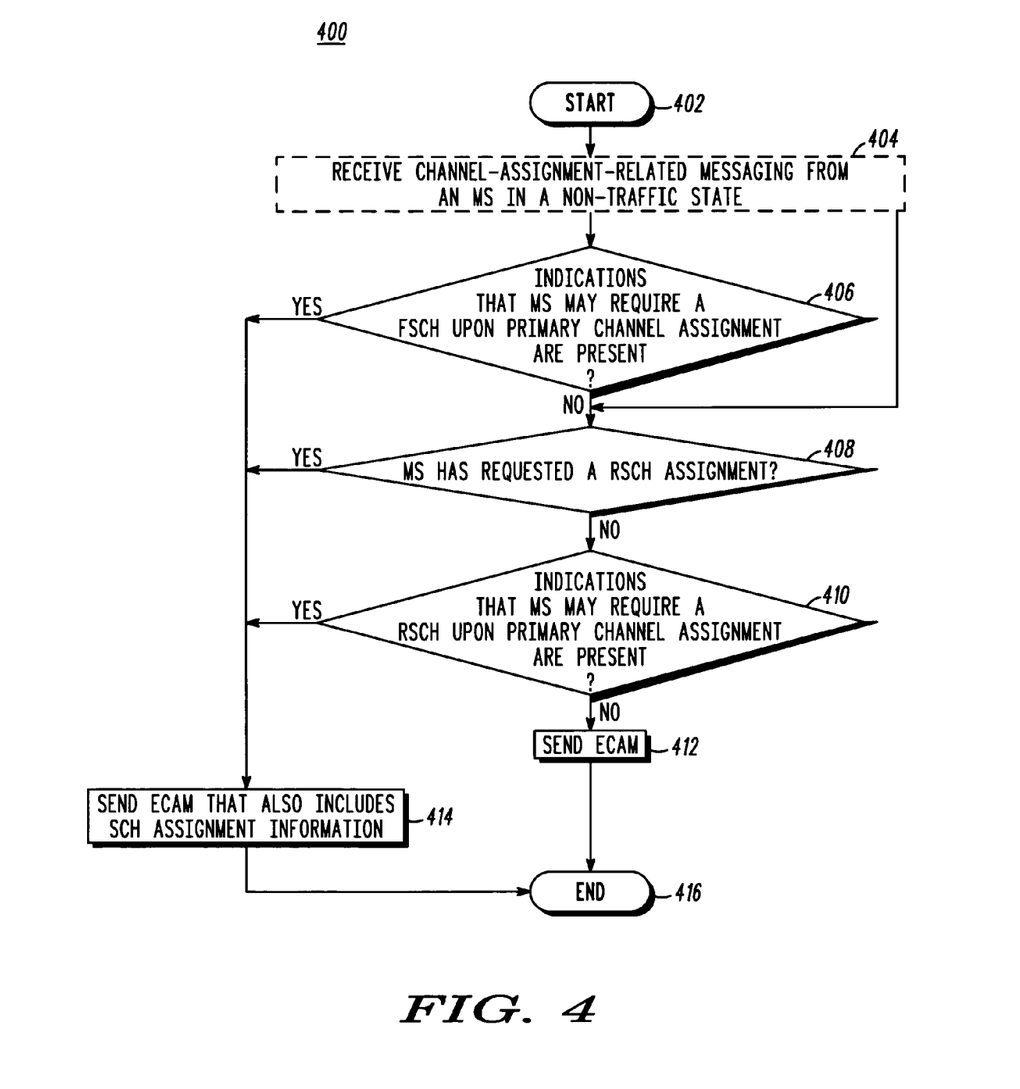
FIG. 4 is a logic flow diagram of functionality performed by a base station (BS) in accordance with a first embodiment of the present invention.

FIG. 4 is a logic flow diagram of functionality performed by a BS in accordance with the first embodiment of the present invention. Logic flow 400 begins (402) with the BS receiving (404) channel-assignment-related messaging, such as an origination, a reconnect, or a page response, from an MS, in a non-traffic state. However, such messaging is not necessary for channel assignment by the BS, since channel assignment may occur without a request or trigger from the MS. In the first embodiment, prior to channel assignment, the BS determines whether upon channel assignment the MS may require a higher data rate than that which a primary channel can provide. Many factors may be considered in making this determination. For example, there may be indications present that the MS may require an F-SCH upon primary channel assignment (406), the messaging received from the MS may explicitly request a R-SCH (408), or there may be indications present that the MS may require an R-SCH upon primary channel assignment (410). If any of these conditions are present, the BS sends (414) channel assignment messaging that comprises primary channel assignment information and IS-2000 Supplemental Channel assignment information for one or more R-SCHs and/or F-SCHs, as conditions warrant. Otherwise, prior art channel assignment messaging, such as an IS-2000 ECAM is sent (412) to the MS and logic flow 400 ends (416).

The BS may have reason to know that an F-SCH is needed (i.e., may be required) upon channel assignment based upon indicators such as the presence of email or voice mail waiting to be sent or, more generally, based upon a certain amount of data waiting to be sent to the MS. An amount of data greater than a threshold such as 500 bytes might be used to trigger the assignment of an F-SCH, for example. Lacking an explicit request for an R-SCH from the MS, the BS may anticipate or speculate that an R-SCH may be needed by the MS upon channel assignment. One or more of the following indicators may be used by the BS when anticipating that an MS may benefit from having an R-SCH (i.e., an R-SCH may be required) upon channel assignment: the MS is capable of supplemental channel operation, a quantity of available wireless resources is greater than a threshold such as 30% of that available in an unloaded system (Thus, the BS may determine to assign supplemental channel resources merely because the resources are available and the MS supports supplemental channel operation), a priority service level is associated with the MS (perhaps as a result of a user paying a higher subscription rate), recent supplemental channel usage by the MS, a recent use by the MS of a service that uses a supplemental channel, data burst messaging is received from the MS (perhaps allowing the BS to infer a R-SCH need based on the data burst type or contents), the MS is requesting a data service (e.g., as indicated in a Service Option (SO) field), the MS is requesting a dispatch service (e.g., as indicated in an SO field), the MS is indicating that the MS has data ready to send (e.g., as indicated in a Data Ready to Send (DRS) field), the MS is indicating an amount of data waiting to be sent is greater than a threshold such as 700 bytes, and a battery of the MS is low. Optionally, the BS may also assign an R-SCH to the MS after assigning an F-SCH in anticipation of signaling from the MS in response to data sent via the F-SCH.

Figure 5:
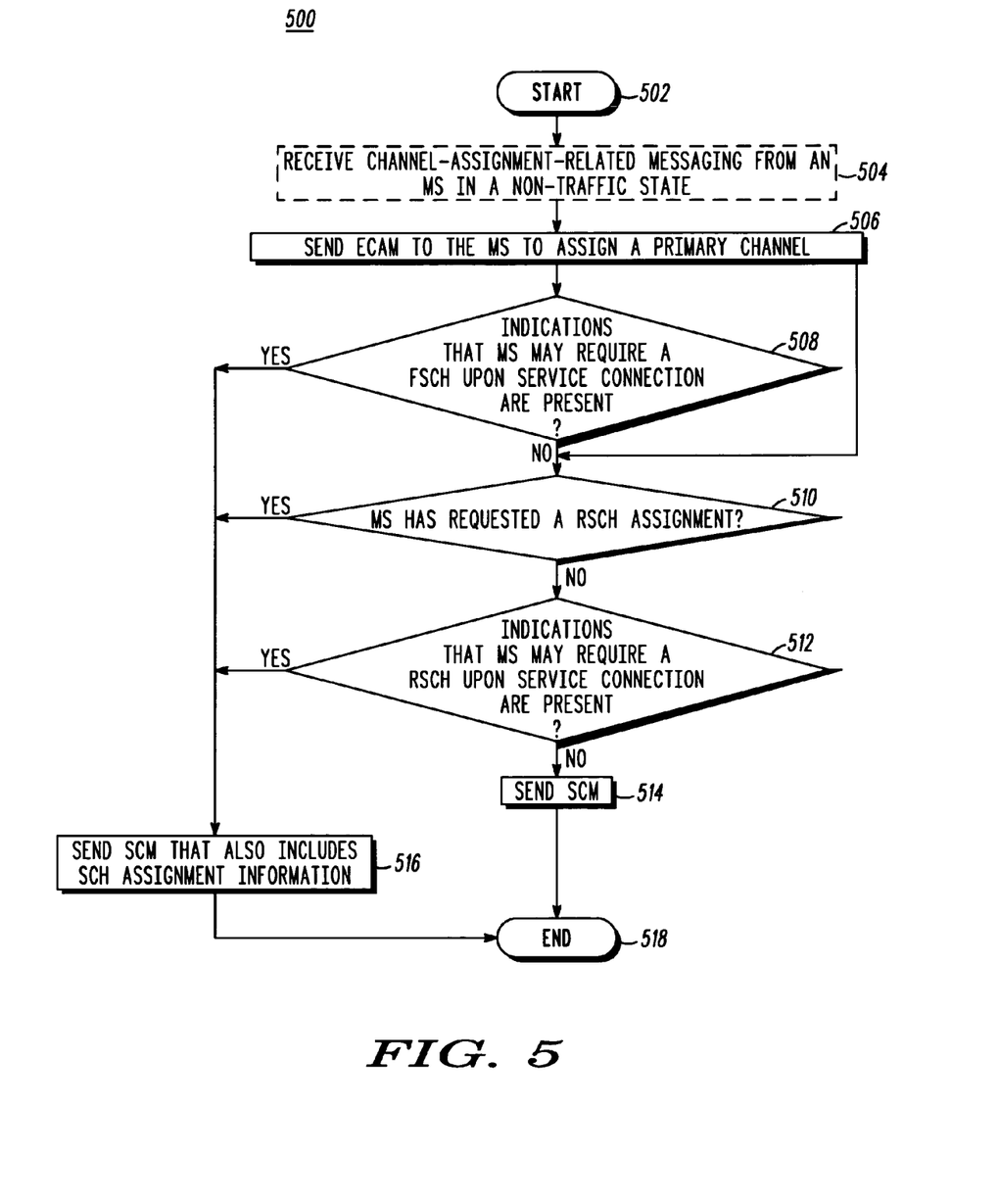
FIG. 5 is a logic flow diagram of functionality performed by a base station (BS) in accordance with a second embodiment of the present invention.

FIG. 5 is a logic flow diagram of functionality performed by a BS in accordance with the second embodiment of the present invention. Logic flow 500 begins (502) with the BS receiving (504) channel-assignment-related messaging, such as an origination, a reconnect, or a page response, from an MS, in a non-traffic state. However, such messaging is not necessary for channel assignment by the BS, since channel assignment may occur without a request or trigger from the MS. The BS then sends (506) prior art channel assignment messaging, such as an IS-2000 ECAM to the MS. In the second embodiment, prior to service connection, the BS determines whether upon service connection the MS may require a higher data rate than that which a primary channel can provide. As in the first embodiment and discussed above the same factors may be considered in making this determination. For example, there may be indications present that the MS may require a F-SCH upon service connection (508), the messaging received from the MS may explicitly request a R-SCH (510), or there may be indications present that the MS may require a R-SCH upon service connection (512). If any of these conditions are present, the BS sends (516) service connection messaging that comprises IS-2000 Supplemental Channel assignment information for one or more R-SCHs and/or F-SCHs, as conditions warrant. Otherwise, prior art service connection messaging, such as an IS-2000 SCM is sent (514) to the MS and logic flow 500 ends (518).

Figure 6:
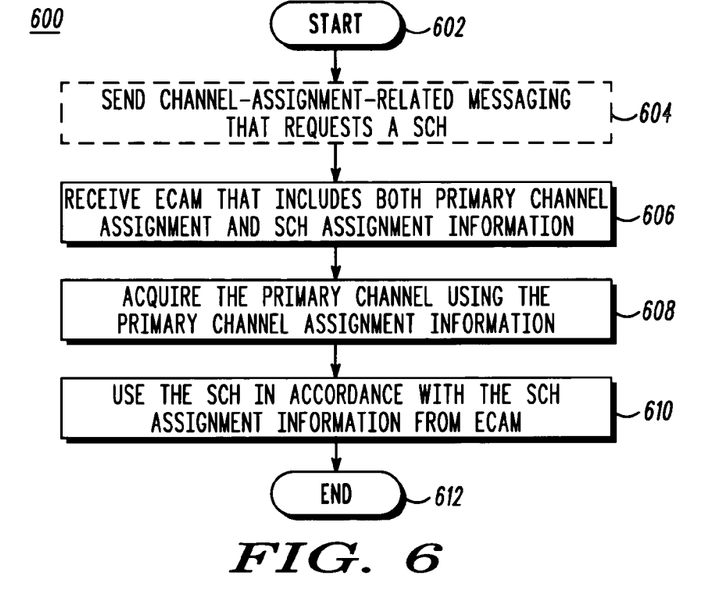
FIG. 6 is a logic flow diagram of functionality performed by a mobile station (MS) in accordance with a first embodiment of the present invention.
Figure 7:
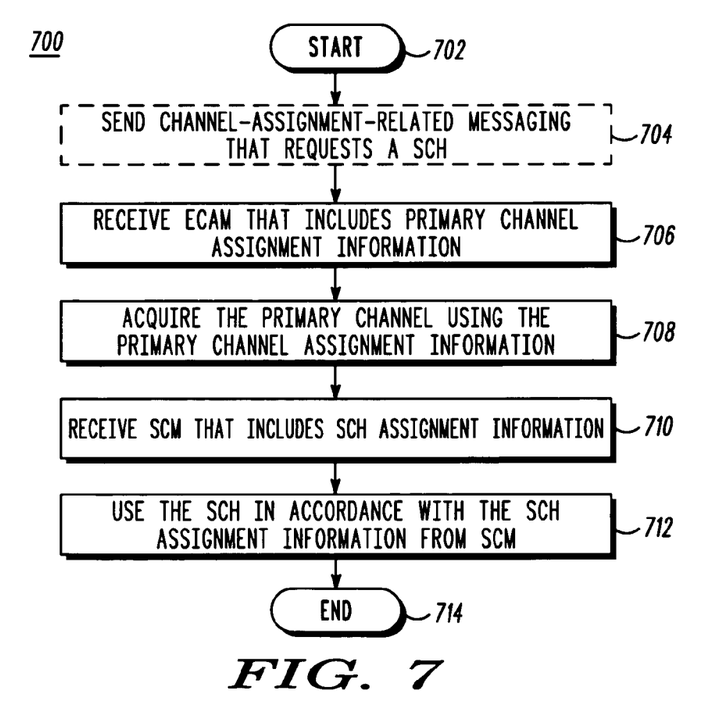
FIG. 7 is a logic flow diagram of functionality performed by a mobile station (MS) in accordance with a second embodiment of the present invention.

FIGS. 6 and 7 are logic flow diagrams of functionality performed by an MS in accordance with the first embodiment (FIG. 6) and the second embodiment (FIG. 7) of the present invention. Logic flows 600 and 700 begin (602 and 702) with the MS, in a non-traffic state, sending (604 and 704) channel-assignment-related messaging to a BS. However, such messaging is not necessary for channel assignment by the BS, since channel assignment may occur without a request or trigger from the MS. In accordance with the first and second embodiments, the MS, as needed, also may indicate in this channel-assignment-related messaging a request for an R-SCH. Thus, this messaging may either be prior art messaging such as an IS-2000 Origination, Reconnect, or Page response, or modified messaging such as an Origination', a Reconnect', or a Page Response' as described above.

In the first embodiment, the MS then receives (606) from the BS channel assignment messaging, such as an IS-2000 ECAM, that comprises both primary channel assignment information and IS-2000 Supplemental Channel assignment information for one or more R-SCHs and/or F-SCHs, as determined by the BS. The MS is then able to acquire (608) the primary channel, using the primary channel assignment information, and subsequently begin using (610) the one or more R-SCHs and/or F-SCHs, in accordance with the IS-2000 Supplemental Channel assignment information received, ending (612) logic flow 600.

In the second embodiment, the MS then receives (706) from the BS prior art channel assignment messaging, such as an IS-2000 ECAM, that comprises primary channel assignment information. The MS is then able to acquire (708) the primary channel, using the primary channel assignment information. The MS then receives (710) service connection messaging that comprises IS-2000 Supplemental Channel assignment information for one or more R-SCHs and/or F-SCHs, as determined by the BS. The MS can then begin using (712) the one or more R-SCHs and/or F-SCHs, in accordance with the IS-2000 Supplemental Channel assignment information received, and logic flow 700 ends (714).

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity, and have not necessarily been drawn to scale. For example, the dimensions of some of the elements in the drawings may be exaggerated relative to other elements to help improve an understanding of the various embodiments of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

What is claimed is:

1. A method for reducing call setup delay comprising:
   determining, by a base station (BS) prior to a channel assignment, whether upon channel assignment a mobile station (MS) may require a higher data rate than that which a primary channel can provide;
   when the MS is in a non-traffic state and when the BS determines that the MS may require the higher data rate upon channel assignment,
   sending, by the BS, channel assignment messaging to the MS to transition the MS to a traffic state, wherein the channel assignment messaging comprises primary channel assignment information and supplemental channel assignment information;
   sending, by the BS to the MS, data via a forward supplemental channel (FSCH) corresponding to the supplemental channel assignment information.

2. The method of claim 1, wherein the supplemental channel assignment information comprises IS-2000 Supplemental Channel assignment information.

3. The method of claim 1, wherein the data is sent without the BS sending to the MS a Service Connect Message (SCM) between sending the channel assignment messaging and sending the data.

4. The method of claim 1, wherein determining whether the MS may require the higher data rate comprises detecting whether at least one indicator is present from the group consisting of
   an amount of data waiting to be sent to the MS is greater than a threshold,
   email is waiting to be sent to the MS, and
   voice mail is waiting to be sent to the MS.

5. The method of claim 1, wherein the channel assignment messaging comprises at least some information from the group consisting of
   a supplemental channel identifier,
   an indication of forward/reverse assignment type,
   an indication of the number of supplemental channels assigned,
   an indication of a duration for the supplemental channel assignment,
   an indication of a start time for the supplemental channel assignment,
   an indication of start time units used to indicate the start time,
   an indication of a maximum allowed duration for discontinuous transmission,
   an indication of whether to use the T_ADD Reverse Supplemental Channel abort feature,
   an indication of a Walsh cover identifier for the supplemental channel assignment, and
   an indication of the number of bits per frame index.

6. The method of claim 1, wherein determining whether the MS may require the higher data rate comprises receiving a request from the MS for a supplemental channel.

7. The method of claim 1, wherein determining whether the MS may require the higher data rate comprises anticipating that the MS may require the higher data rate without an explicit indication that the MS will require the higher data rate.

8. The method of claim 7, wherein anticipating that the MS may require the higher data rate involves detecting whether at least one indicator is present from the group consisting of
the MS is capable of supplemental channel operation,
a quantity of available wireless resources is greater than a threshold,
a priority service level is associated with the MS,
recent supplemental channel usage by the MS,
a recent use by the MS of a service that uses a supplemental channel,
data burst messaging is received from the MS,
the MS is requesting a data service,
the MS is requesting a dispatch service,
the MS is indicating that the MS has data ready to send,
the MS is indicating an amount of data waiting to be sent greater than a threshold, and
a battery of the MS is low.

9. A method for reducing call setup delay comprising:
sending, by a base station (BS) to a mobile station (MS), a channel assignment to transition the MS to a traffic state, wherein the channel assignment provides primary channel assignment information;
determining, by the BS, prior to service connection, whether upon service connection the MS may require a higher data rate than that which a primary channel can provide;
when the BS determines that the MS may require the higher data rate upon service connection,
sending, by the BS to the MS in the traffic state, service connection messaging that comprises supplemental channel assignment information, wherein the service connection messaging comprises at least some information from the group consisting of
a supplemental channel identifier,
an indication of forward/reverse assignment type,
an indication of the number of supplemental channels assigned,
an indication of a duration for the supplemental channel assignment,
an indication of a start time for the supplemental channel assignment;
an indication of start time units used to indicate the start time,
an indication of a maxium allowed duration for discontinuous transmission,
an indication of whether to use the T ADD Reverse Supplemental Channel abort feature,
an indication of a Walsh cover identifier for the supplemental channel assignment, and
an indication of the number of bits per frame index.

10. The method of claim 9, wherein the service connection messaging comprises an IS-2000 Service Connect Message (SCM).

11. A method for reducing call setup delay comprising:
receiving, from a base station (BS) by a mobile station (MS) in a non-traffic state, channel assignment messaging to transition the MS to a traffic state, wherein the channel assignment messaging comprises primary channel assignment information and supplemental channel assignment information;
acquiring a primary channel using the primary channel assignment information; and after acquiring the primary channel, receiving data via a forward supplemental channel (FSCH) corresponding to the supplemental channel assignment information.

12. The method of claim 11, wherein the channel assignment messaging comprises at least some information from the group consisting of
a supplemental channel identifier,
an indication of forward/reverse assignment type,
an indication of the number of supplemental channels assigned,
an indication of a duration for the supplemental channel assignment,
an indication of a start time for the supplemental channel assignment,
an indication of start time units used to indicate the start time,
an indication of a maximum allowed duration for discontinuous transmission,
an indication of whether to use the T_ADD Reverse Supplemental Channel abort feature,
an indication of a Walsh cover identifier for the supplemental channel assignment, and
an indication of the number of bits per frame index.

13. The method of claim 11, further comprising sending, by the MS to the BS, a request for a supplemental channel via messaging of a messaging type from the group consisting of origination messaging, page response messaging, and reconnect messaging.

14. A method for reducing call setup delay comprising:
receiving, from a base station (BS) by a mobile station (MS), a channel assignment to transition the MS to a traffic state, wherein the channel assignment provides primary channel assignment information;
acquiring a primary channel using the primary channel assignment information;
receiving, by the MS in the traffic state, service connection messaging that comprises supplemental channel assignment information, wherein the service connection messaging comprises at least some information from the group consisting of
a supplemental channel identifier,
an indication of forward/reverse assignment type,
an indication of the number of supplemental channels assigned,
an indication of a duration for the supplemental channel assignment,
an indication of a start time for the supplemental channel assignment,
an indication of start time units used to indicate the start time,
an indication of a maxium allowed duration for discontinuous transmission,
an indication of whether to use the T ADD Reverse Supplemental Channel abort feature,
an indication of a Walsh cover identifier for the supplemental channel assignment, and
an indication of the number of bits per frame index; and
after service connection, using a supplemental channel corresponding to the supplemental channel assignment information.

15. A base station (BS) comprising:
a transceiver;
a controller, communicatively coupled to the transceiver, adapted to determine, prior to a channel assignment, whether upon channel assignment a mobile station (MS) may require a higher data rate than that which a primary channel can provide, adapted to send, via the transceiver when the MS is in a non-traffic state and when the BS determines that the MS may require the higher data rate upon channel assignment, channel assignment messaging to the MS to transition the MS to a traffic state, wherein the channel assignment messaging comprises primary channel assignment information and supplemental channel assignment information, and adapted to send, to the MS via the transceiver, data via a forward supplemental channel (FSCH) corresponding to the supplemental channel assignment information.

16. A base station (BS) comprising:

a transceiver;

a controller, communicatively coupled to the transceiver,
  adapted to send to a mobile station (MS) via the transceiver a channel assignment to transition the MS to a traffic state, wherein the channel assignment provides primary channel assignment information,
  adapted to determine prior to service connection, whether upon service connection the MS may require a higher data rate than that which a primary channel can provide, and
  adapted to send to the MS in the traffic state via the transceiver, when the BS determines that the MS may require the higher data rate upon service connection, service connection messaging that comprises supplemental channel assignment information, wherein the service connection messaging comprises at least some information from the group consisting of
  a supplemental channel identifier,
  an indication of forward/reverse assignment type,
  an indication of the number of supplemental channels assigned,
  an indication of a duration for the supplemental channel assignment,
  an indication of a start time for the supplemental channel assignment,
  an indication of start time units used to indicate the start time,
  an indication of a maxium allowed duration for discontinuous transmission,
  an indication of whether to use the T ADD Reverse Supplemental Channel abort feature,
  an indication of a Walsh cover identifier for the supplemental channel assignment, and
  an indication of the number of bits per frame index.

17. A mobile station (MS) comprising:

a transceiver;

a processor, communicatively coupled to the transceiver,
  adapted to receive, via the transceiver from a base station (BS) in a non-traffic state, channel assignment messaging to transition the MS to a traffic state, wherein the channel assignment messaging comprises primary channel assignment information and IS-2000 Supplemental Channel assignment information,
  adapted to acquire using the transceiver a primary channel using the primary channel assignment information, and
  adapted to receive via the transceiver, after acquiring the primary channel, data via a forward supplemental channel (FSCH) corresponding to the supplemental channel assignment information.

18. A mobile station (MS) comprising:

a transceiver;

a processor, communicatively coupled to the transceiver,
  adapted to receive via the transceiver from a base station (BS) a channel assignment to transition the MS to a traffic state, wherein the channel assignment provides primary channel assignment information,
  adapted to acquire using the transceiver a primary channel using the primary channel assignment information,
  adapted to receive via the transceiver, by the MS in the traffic state, service connection messaging that comprises supplemental channel assignment information, wherein the service connection messaging comprises at least some information from the group consisting of
  a supplemental channel identifier,
  an indication of forward/reverse assignment type,
  an indication of the number of supplemental channels assigned,
  an indication of a duration for the supplemental channel assignment,
  an indication of a start time for the supplemental channel assignment,
  an indication of start time units used to indicate the start time,
  an indication of a maxium allowed duration for discontinuous transmission,
  an indication of whether to use the T ADD Reverse Supplemental Channel abort feature,
  an indication of a Walsh cover identifier for the supplemental channel assignment, and
  an indication of the number of bits per frame index, and
  adapted to use via the transceiver, after service connection, a supplemental channel corresponding to the IS-2000 Supplemental Channel assignment information.

* * * * *